United States Patent [19]
Furlong et al.

[11] Patent Number: 6,154,774
[45] Date of Patent: Nov. 28, 2000

[54] IN-WALL DATA TRANSLATOR AND A STRUCTURED PREMISE WIRING ENVIRONMENT INCLUDING THE SAME

[75] Inventors: Daryl Furlong, Uxbridge, Mass.; Hong Yu, Hollis, N.H.

[73] Assignee: Lancast, Inc., Nashua, N.H.

[21] Appl. No.: 09/109,398

[22] Filed: Jul. 2, 1998

[51] Int. Cl.$^7$ .................................................. G06F 15/173
[52] U.S. Cl. .......................................... 709/224; 709/230
[58] Field of Search .................................... 709/224, 238, 709/230; 370/446, 293, 276, 279, 280, 281, 282, 299, 295, 296, 445, 451, 461, 462, 465

[56] References Cited

U.S. PATENT DOCUMENTS

| | | | |
|---|---|---|---|
| 4,491,983 | 1/1985 | Pinnow et al. | 455/612 |
| 4,690,491 | 9/1987 | Stein et al. | 350/96.16 |
| 4,725,249 | 2/1988 | Blackwood et al. | |
| 4,751,613 | 6/1988 | Werdin et al. | 361/424 |
| 4,756,695 | 7/1988 | Lane et al. | |
| 4,859,201 | 8/1989 | Marsh . | |
| 4,863,233 | 9/1989 | Nienaber et al. | 350/96.22 |
| 4,878,653 | 11/1989 | Brown | 259/139.3 |
| 4,977,329 | 12/1990 | Eckhardt et al. | 250/551 |
| 5,054,060 | 10/1991 | Werdin et al. | 379/324 |
| 5,315,424 | 5/1994 | Boden et al. | 359/152 |
| 5,349,644 | 9/1994 | Massey et al. . | |
| 5,366,388 | 11/1994 | Freeman et al. . | |
| 5,481,478 | 1/1996 | Palmieri et al. . | |
| 5,562,493 | 10/1996 | Ferrill et al. . | |
| 5,671,355 | 9/1997 | Collins . | |
| 5,822,102 | 10/1998 | Bodeep et al. | 359/167 |
| 6,023,472 | 2/2000 | Kupchik et al. | 370/446 |

OTHER PUBLICATIONS

Case et al, "A simple Network Management Protocal (SNMP)", Network Working Group, RFC 1157, pp 1–36, May 1990.

McCloghrie et al, "Management Information Base for Network Management of TCP/IP Based Internets MIB–II," Network Working Group, RFC 1158, pp. 1–70, Mar. 1991.

Case et al, "Management Information Base for Version 2 of the Simple Network Management Protocol (SNMPv2)," Network Working Group, RFC 1450, pp 1–27, Mar. 1993.

Z. Celero, "Simple Network Management Protocol (SNMP) Current Standards and Status," http://www.mice.iihe.ac.be/scimitar/J1098/stc–98–06.html, Mar. 1998.

*Primary Examiner*—Mehmet B. Geckil
*Attorney, Agent, or Firm*—Stephen G. Matzuk

[57] ABSTRACT

A fiber-optic to twisted pair data translator configured to be disposed within a wall and thus become part of the building, which further includes a central data distribution facility, such as a communication closet and connecting fiber-optic cables to create a totally integrated structured premise wiring which provides the tenant occupant with the advantages of high-bandwidth fiber-optic communication by a simple twister-pair connection. Moreover, the in-wall data translator according to the present invention provides data format converting intelligence at the wall plate and may be internally or externally powered to maximum flexibility in network architecture while minimizing the building installation costs and inventory of data network components.

16 Claims, 3 Drawing Sheets

IN-WALL DATA TRANSLATOR AND A STRUCTURED PREMISE WIRING ENVIRONMENT INCLUDING THE SAME

FIELD OF THE INVENTION

The present invention relates to multiple medium data network systems, in particular, to structured premise wiring of multiple medium data networks including an active in-wall data medium translator which provides the interface for network-attached data equipment.

BACKGROUND OF THE INVENTION

Data networks installed in buildings generally include various forms of twisted pair, coaxial and fiber-optic media, requiring significant installation expense. With each upgrade, the attached data equipment must be modified or replaced, and additional parts in inventory. Moreover, such expense is frequently borne by the tenant. When the tenant vacates, the network system is often removed, leaving the next tenant to repeat the process. Moreover, when several tenants inhabit the same floor or building, the competition for limited data or communication closet space is severe, and the equipment may be redundant.

In new office space build-out, direct-to-desktop fiber-optic installations are offered as a "state-of-the-art" installation 20, as illustrated in FIG. 1. However, to receive the fiber-optic connection, the desk top equipment 30 needs to have a costly fiberoptic media card 31 or external adapter (not shown) available, which adds to the cost of each desktop equipment. If the fiberoptic adapter is installed in the desk top equipment, its cost will be lost with each upgrade of the desktop equipment 30. In addition, as the network fiber 23 is typically terminated at a wall plate 26 fiber-optic connector 25, a fiber-optic 'jumper cable' 28 is required which has delicate and expensive connections 27, 29 at the wall plate 26 and at the desktop equipment, presenting further significant expense to the user. Were portable equipment to be used, a fiber-optic cable (28) would also need to be carried or supplied to mate the specific fiber-optic connectors, further adding to the expense and difficulty of fiber-optic to desktop installations.

SUMMARY OF THE INVENTION

The present invention includes an active in-wall building network terminating fixture typically mounted in a electric wall utility box. The in-wall fixture provides active translation from one data medium, typically optical fiber, to a second medium such as twisted pair copper via an RJ-45 telephone style connector. The in-wall fixture includes transceivers for each of the media, the corresponding physical layer logic, and the common data translation logic such as described in the U.S. Pat. No. 6,023,472, entitled HIGH SPEED FD/HD DATA TRANSLATOR AND NETWORK, incorporated by reference, as well as other data translators, e.g. Lancast Model 4318, 6318 and 7000-Series products.

According to a further embodiment of the present invention provides a novel structured premise wiring environment wherein a plurality of the individual active in-wall translation fixtures are disposed throughout a building and connected to a common data hub, switch, repeater, etc. via fiber-optic cables. The in-wall translation fixtures are typically located adjacent the desktop area and interconnected to the desktop equipment with inexpensive twisted pair, coaxial or other copper medium. Thus the structured premise wiring environment according to the present invention provides the advantages of fiber-optic communication systems without the inconvenience and expense of wall-to-desktop fiberoptic connections, the expense of internal or external fiber-optic-to-twisted pair converters, and the expense and inconvenience of large data system inventory. Moreover, the installation costs of the structured environment according to the present invention is amortizable as a building fixture, which will be recoverable, and not burden the tenant or user with added expenses.

BRIEF DESCRIPTION OF THE DRAWING

These and further features of the present invention will be better understood by reading the following Detailed Description together with the Drawing, wherein.

DETAILED DESCRIPTION OF THE INVENTION

Figure 1:
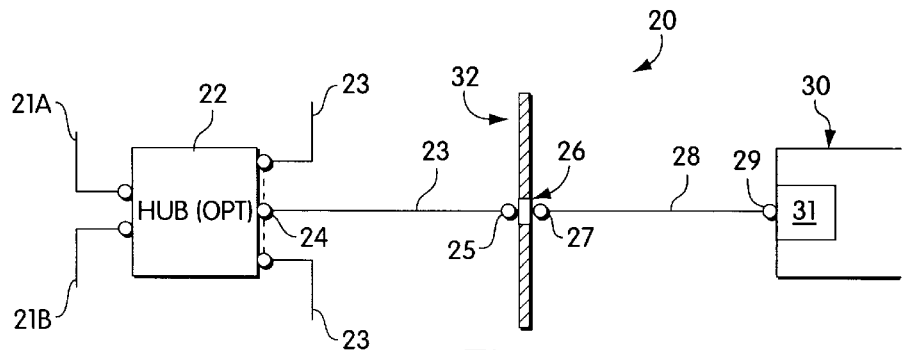
FIG. 1 is a block diagram representation of prior art building data network installations.
Figure 2:
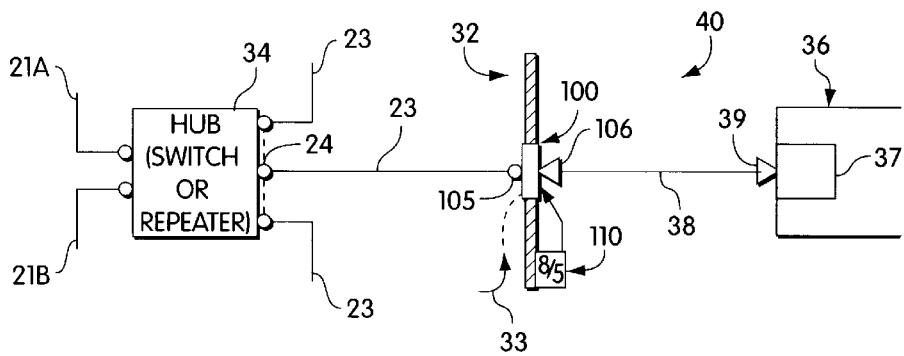
FIG. 2 is a block diagram representation of a minimum data network installation including an in-wall translator fixture according to one embodiment of the present invention.
Figure 3:
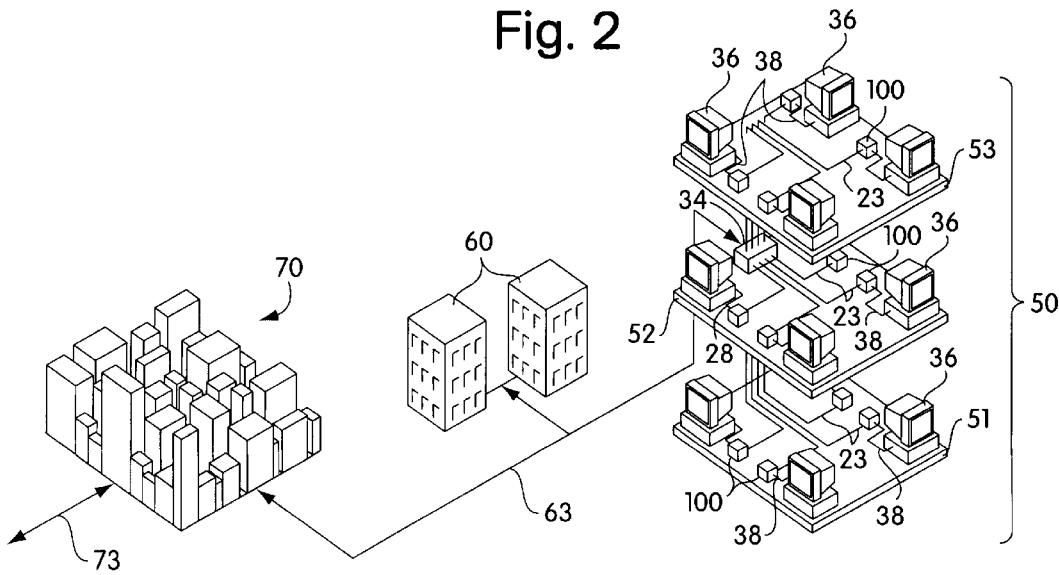
FIG. 3 is a block diagram representation of a larger implementation of the structured premise wiring environment according to one embodiment of the present invention.

One embodiment 100 of the in-wall data translator according to the present invention is shown in the environment 40 of FIG. 2, wherein the incoming network cable 21A, typically a single or multi-mode optical fiber transmission line, is connected to a hub (or alternately a switch or repeater) 34, which provides multiple data paths through a building structure (e.g. floors 51, 52, 53 discussed below) to a variety of desk top data equipment 36 via an active in-wall data translator 100. The hub 34 is connected to the in-wall data translator 100 with a fiber-optic cable 23 communicating in a suitable format and protocol such as FDDI, Ethernet, Fast Etherenet, GigaEthernet, Token Ring, ATM and/or Fibre Channel. The in-wall data translator 100 provides corresponding data to the desk top equipment 36 internal network interface card (NIC) 37 via inexpensive twisted pair connecting cable 38 and inexpensive NIC with simple, inexpensive connectors 106, 39. An external power supply 110, typically an outlet-hung plug-in supply provides the operating power to the in-wall data translator 100 by appropriate connectors, discussed below. Alternately, an in-wall power feed 33 may be provided to the in-wall data translator 100 for new construction. A further embodiment of the present invention is provided by the larger structured premise wiring environment 50 having three building floors 51, 52, 53 which are connected via a hub (alternately a switch, repeater, etc.) 34 to neighboring buildings 60 or the greater metropolitan area 70 via single or multi-mode fiber-optic cable 63, and further connected to worldwide data networks via fiber-optic cable 73.

The hub 34 is connected to various in-wall data translators 100 (the walls being omitted for clarity in this Figure) on the different floors 51, 52, 53 via fiber-optic cables 23. Each in-wall data translator 100 is connected to respective desk top data equipment 36 via twisted pair cables 38.

Figure 4:
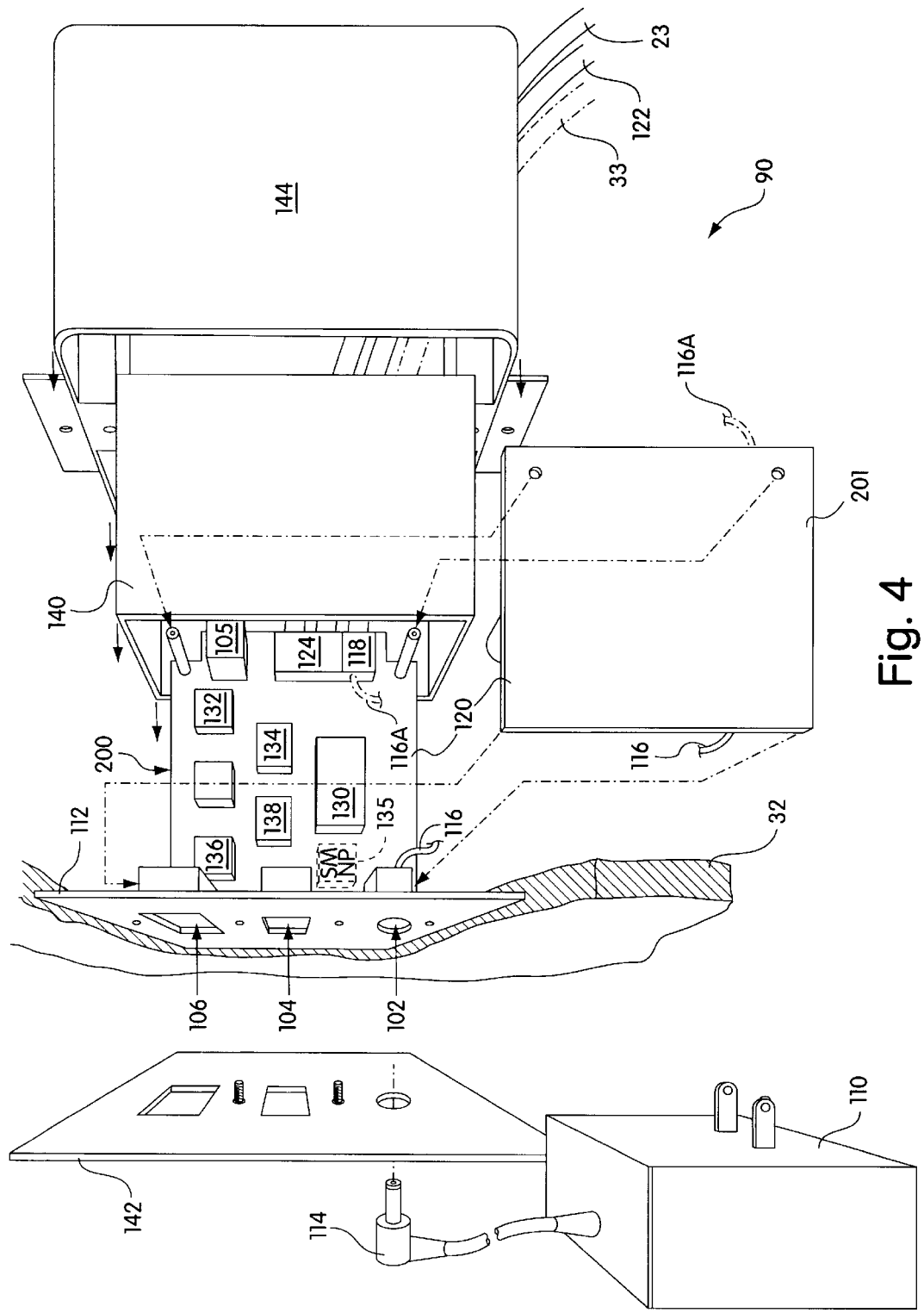
FIG. 4 is an exploded, perspective view of the in-wall active translator fixture according to one embodiment of the present invention.

The typical physically installed structure 90 of the present invention is shown in FIG. 4, in relation to a standard wall box opening in a wall 32. The in-wall data translator 100 comprises a front connector plate 112, having data connector 106 such as an RJ-45 type, optional voice telephone connector 104 and power connector 102 thereon, a circuit card assembly 120 in which comprises a single circuit card 200A, and an optional housing 140 for protective covering thereover, and is received by a common in-wall work box 144 having the appropriate cable routed thereto. Alternately the card assembly 120 will also include a second circuit card, e.g. 201, for ancillary or support circuitry such as power supply, etc. circuitry. The external power supply 110 is connected to the circuitry via plug 114 and socket 102 which is then connected 116 to power supply circuitry on board 201 or directly to board 200. The alternately supplied in-wall power is received via wire 33, connector 118 and board 201 or 200 to be processed as known in the art to provide the necessary circuitry power. A cover plate 142 provides aesthetic covering of the in-wall data translator 100 and the wall 32 opening.

The embodiment 100 according to the present invention also include an optional telephone connector, e.g an RJ-11 type, which is directly connected to a telephone line 122 via connector 124.

The fiber-optic cable 23 is connected to the circuitry on board 200 via generally available connector 105, which receives the optical signal and provides a corresponding electrical signal to the circuitry. Typically, the board 200 includes fiber-optic medium format data transceiver and physical layer circuitry, 132, 134 respectively, twisted-pair medium format data transceiver and physical layer circuitry, 136 and 138, and data conversion storage and/or processing circuitry 130, explained in greater detail below with specific exemplary implementation. The signal from the twisted pair connector 106 is received by the data transceiver 136. A further optional implementation includes a SNMP (Simple Network Management Protocol) agent 135 on board 200 for remote monitoring, control and auto-negotiation of the operations of the particular in-wall data translator on which it is resident, as known in the art and discussed below with reference to FIG. 5.

The circuitry for the in-wall media converters 100 included in the present application correspond to the medium connected, wherein the respective media are typically received by physical layer circuitry (PHY) and translated via specific data processing and/or data storage circuitry as provided by corresponding media access controllers (MAC). A specific exemplary embodiment of the circuit board 200 is provided by the circuit block diagram 220 of FIG. 5, wherein the in-wall fiber-optic connection is provided to connector 222, which receives information from and sends information to encoder 224 and clock recovery circuit 226, respectively. The recovered clock and data signals are sent to the decoder 228, the resulting data is scrambled by device 230 and then encoded to NRZI code by encoder 232. Thereafter, the signal is converted by converter 234 and received by transfer logic 236 and then to RJ45 (or other appropriate) connector 106A such as connector 106 typically mounted on the translator front connector plate 112. A connection is made to desktop equipment via twisted pair (or other desired) media connector.

Data from the desktop equipment via the twisted pair connector 106A and converted by converter 238 and subsequently by clock recovery PLL 240 before being received by decoder 242. The data is then passed to the descrambler 244 and thereafter to the encoder 224 if not interrupted by a switch 246, and on to the fiber optic cable via the connector 222. Typically, the devices corresponding to blocks 222 thru 248 are contained on the board 200 of FIG. 4 The data transfer and data translator activity is monitored by a card-resident SNMP agent 248, which optionally received data from the decoder 228 and/or the scrambler 244. The agent 248 sends the information via an out-of-band connection to a separate medium path, or in-band by first interrupting the data flow by opening data switch 246, or equivalent device. The operation and structure of the SNMP agent provides information relating to the system configuration and status and send this information to a Management Information Base (MIB), in the hub 34 or other data center on the network medium (63) for network management (not shown) according to known techniques. Thus, the present invention allows the network management to monitor and/or control the network up to the desk top equipment without requiring modification of that equipment. Moreover, the scope of the present invention includes gateways comprising other than the SNMP (and agents) to monitor and manage the device, such as described in section 28 of the IEEE 802.3 standards description.

Figure 5:
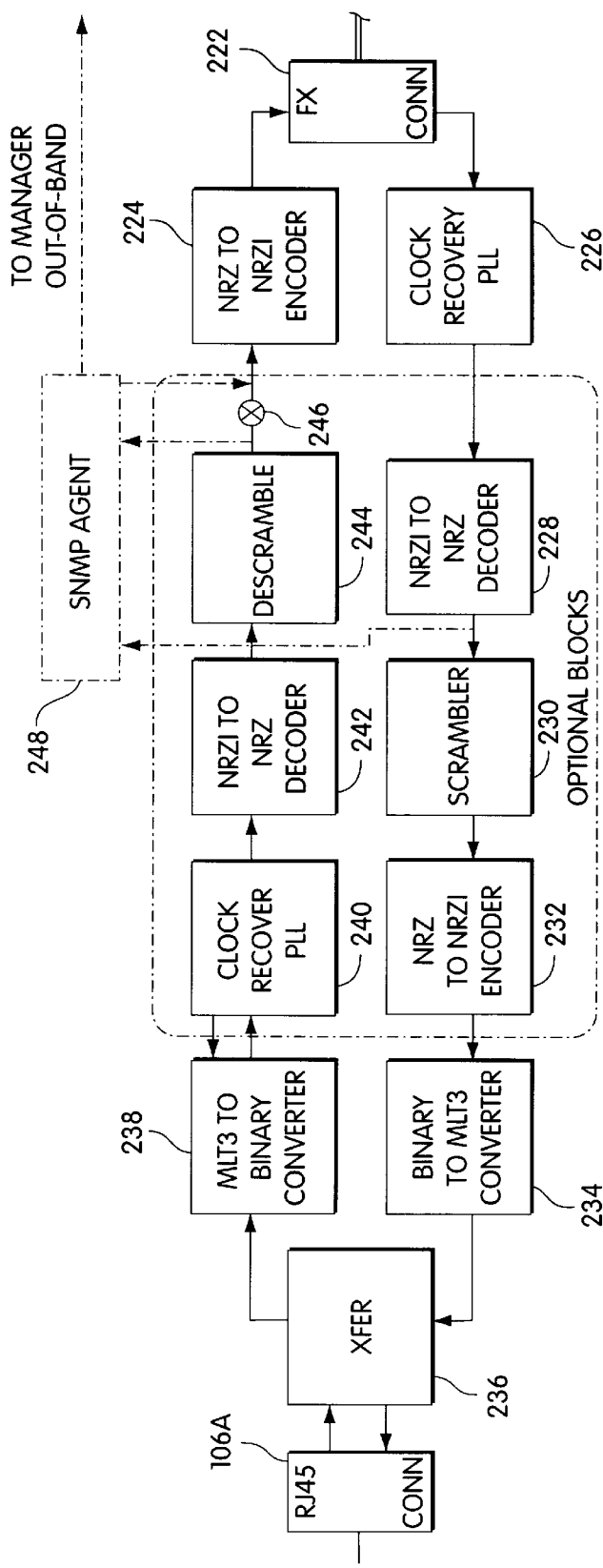
FIG. 5 is a block diagram of the constituent component of the embodiment of FIG. 4 have a fiber-to-twisted pair to Fiber Optic converter with optional SNMP connection.

Further embodiments of the present invention of FIG. 5 provide for the translation between Fiber optic (FX) and CDDI and FDDI media by modifications to provide the appropriate connectors and logic to the converter 220 of FIG. 5. Moreover, alternate media conversion according to the converter 220 omits blocks 228, 230, 232, 240 and 244 as appropriate, and the (optional) SNMP is connected to the remaining data paths.

Figure 6:
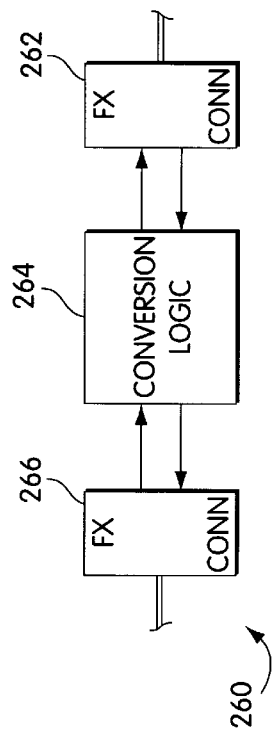
FIG. 6, is a block diagram of an embodiment of the present invention with SONET, Token Ring and ATM data conversion configurations.

A similar implementation 260 of the in-wall data translator for Synchronous Optical NETwork (SONET) is provided by FIG. 6, wherein the in-wall fiber optic cable is connected to connector 262 which receives data from and passes data to the conversion logic 264, which is in turn connected to wall-plate 112 fiber optic connector 266 corresponding to the fiber optic medium used. The fiber optic connector 266 also comprises a transceiver for 850 nm, 1300 nm, or any other wavelength single mode or multi-mode fiber optic medium.

The in-wall data translator 100 also includes the circuitry of U.S. Pat. No. 6,023,472, discussed above.

Further modifications and substitutions of the above described invention as made by one of ordinary skill are included within the scope of the present invention, which is not limited except by the claims which follow.

What is claimed is:

1. An active wall plate data translator comprising:
   a wall-mountable utility wall plate having means for mounting to at least one constituent element of a wall;
   a first data transceiver adapted to receive and transmit data in a first format and a first data protocol;
   a second data transceiver adapted to receive and transmit data in a first format and a first data protocol, wherein
      said first and said second data transceivers are connected to provide a bi-directional data path therebetween,
      said first and said second data transceivers are mounted in fixed relation to said utility panel; and
   a power supply adapted to provide power to said first and second data transceivers.

2. The active wall plate data translator of claim 1, wherein said first format is a fiber-optic format.

3. The active wall plate data translator of claim 1, wherein said second format is one of a twisted pair, an FDDI, a CDDI, an ATM, and a Token Ring format.

4. The active wall plate data translator of claim 1, wherein said first data transceiver comprises a modulator/demodulator corresponding to said first data format and protocol and a first physical layer module receiving a signal from and providing to said modulator/demodulator, said second data transceiver comprises a modulator/demodulator corresponding to said second data format and protocol and a second physical layer module receiving a signal from and providing to said second data format and protocol modulator and demodulator, said active wall plate data translator, further including a data translator connected to provide a data path between said first and second data format and protocol physical layer modules.

5. The active wall plate data translator of claim 4, further comprising a box disposed to substantially surround said first and second data transceivers.

6. The active wall plate data translator of claim 5, wherein said power supply comprises a power supply external to said box.

7. A building communications data infrastructure providing a network data connection to equipment within rooms of said building, comprising a building data distribution center;

a plurality of in-wall data translators each providing a first format connection and a second format connection and data flow therebetween; and a communication medium connecting said building distribution center to each of said first format connections, wherein said in-wall data translators provides second format network connection to said equipment.

8. The building communications data infrastructure, of claim 7, wherein said building distribution center includes at least one of a data hub, a data switch, and a data repeater device.

9. The building communications data infrastructure, of claim 7, wherein at least one of said in-wall data translators further includes a system monitor device for network monitoring.

10. The building communications data infrastructure, of claim 9, wherein said system monitoring device comprises a simple network management protocol agent.

11. The building communications data infrastructure of claim 10, wherein said building distribution center includes a management information base connected to each said simple network management protocol agent.

12. The building communications data infrastructure, of claim 7, further including data translator power sources.

13. The building communications data infrastructure, of claim 12, wherein said power sources are individual power sources disposed at each said in-wall data translator and external to said wall box.

14. A communications network, comprising a a first medium connecting a plurality of building units, each unit having at least one room therein defined by a perimeter wall structure;

a first converter disposed within at least one of said building units, and being connected to said first medium and providing a data flow to a second medium;

a second converter disposed at said perimeter wall of at least one said room, and being connected to said second medium and providing a data flow to a connector of a third medium; and a second medium connecting said first and second converters.

15. The communications network of claim 14, wherein said second medium is a fiber optic medium.

16. The communications network of claim 14, wherein said third medium is one of twisted pair, FDDI, CDDI, Ethernet and SONET format media.

* * * * *

UNITED STATES PATENT AND TRADEMARK OFFICE
CERTIFICATE OF CORRECTION

PATENT NO. : 6,154,774  
DATED : November 28, 2000  
INVENTOR(S) : Darrell Furlong et al.

Page 1 of 1

It is certified that error appears in the above-identified patent and that said Letters Patent is hereby corrected as shown below:

<u>Title page,</u>  
Item [75], Inventors, change first name from "Daryl" to -- Darrell --.  
Item [57], ABSTRACT, change "twister-pair" to -- twisted-pair --.

<u>Column 2,</u>  
Line 14, change "Drawing" to -- Drawings --.  
Line 31, remove "," after "6".

<u>Column 3,</u>  
Line 26, change "include" to -- includes --.

<u>Column 4,</u>  
Line 15, change "send" to -- sends --.  
Line 58, change both occurrences of "first" to -- second --.  
Line 63, change "panel" to -- wall plate --.

<u>Column 6,</u>  
Line 19, after "comprising" insert -- : --.

Signed and Sealed this

Third Day of February, 2004

JON W. DUDAS  
*Acting Director of the United States Patent and Trademark Office*